United States Patent
Choi et al.

(10) Patent No.: US 12,025,813 B2
(45) Date of Patent: Jul. 2, 2024

(54) CAMERA MODULE

(71) Applicant: Samsung Electro-Mechanics Co., Ltd., Suwon-si (KR)

(72) Inventors: Chul Choi, Suwon-si (KR); Dong Hun Han, Suwon-si (KR); Sang Lae Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 557 days.

(21) Appl. No.: 16/721,977

(22) Filed: Dec. 20, 2019

(65) Prior Publication Data
US 2020/0218082 A1 Jul. 9, 2020

(30) Foreign Application Priority Data
Jan. 9, 2019 (KR) .................. 10-2019-0002701

(51) Int. Cl.
| | |
|---|---|
| G03B 5/00 | (2021.01) |
| G02B 7/18 | (2021.01) |
| G02B 7/182 | (2021.01) |
| G02B 27/64 | (2006.01) |
| H04N 23/51 | (2023.01) |
| H04N 23/54 | (2023.01) |
| H04N 23/55 | (2023.01) |
| H04N 23/68 | (2023.01) |

(52) U.S. Cl.
CPC .......... *G02B 27/646* (2013.01); *G02B 7/1805* (2013.01); *G02B 7/1822* (2013.01); *G03B 5/00* (2013.01); *H04N 23/51* (2023.01); *H04N 23/54* (2023.01); *H04N 23/55* (2023.01); *H04N 23/685* (2023.01); *G03B 2205/0069* (2013.01)

(58) Field of Classification Search
CPC ..................... H04N 23/685; G03B 2205/03
USPC ..................................... 348/208.99
See application file for complete search history.

(56) References Cited

U.S. PATENT DOCUMENTS

| | | | |
|---|---|---|---|
| 10,488,631 B2 * | 11/2019 | Bachar ............... | G02B 27/646 |
| 2009/0141375 A1 | 6/2009 | Chang | |
| 2010/0097713 A1 | 4/2010 | Miura | |
| 2012/0086848 A1 | 4/2012 | Tsai et al. | |
| 2014/0253677 A1 | 9/2014 | Chen et al. | |

(Continued)

FOREIGN PATENT DOCUMENTS

| | | |
|---|---|---|
| CN | 101113895 A | 1/2008 |
| CN | 101452103 A | 6/2009 |

(Continued)

OTHER PUBLICATIONS

Chinese Office Action issued on Oct. 8, 2021, in counterpart Chinese Patent Application No. 202010020701.7 (5 pages in English and 7 pages in Chinese).

(Continued)

*Primary Examiner* — Anthony J Daniels
(74) *Attorney, Agent, or Firm* — NSIP Law

(57) ABSTRACT

A camera module includes a lens module having lenses; a reflection module disposed on an object side of the lens module, and changing a path of light so that the light incident inside is directed toward the lens module; and an image sensor disposed on an image side of the lens module. The reflection module can be rotated about a first axis and a second axis perpendicular to the first axis, and an imaging plane of the image sensor includes a curved surface.

8 Claims, 17 Drawing Sheets

(56) References Cited

U.S. PATENT DOCUMENTS

| | | | |
|---|---|---|---|
| 2015/0077619 A1 | 3/2015 | Yamano | |
| 2016/0050379 A1 | 2/2016 | Jiang et al. | |
| 2016/0062084 A1* | 3/2016 | Chen | G02B 5/208 |
| | | | 348/335 |
| 2018/0024329 A1 | 1/2018 | Goldenberg et al. | |
| 2018/0052385 A1 | 2/2018 | Juhola et al. | |
| 2018/0109660 A1 | 4/2018 | Yoon et al. | |
| 2018/0239161 A1* | 8/2018 | Seol | G02B 7/1821 |
| 2018/0252899 A1 | 9/2018 | Lim et al. | |
| 2018/0316847 A1* | 11/2018 | Lau | G02B 7/09 |
| 2018/0329276 A1* | 11/2018 | Hu | G03B 17/17 |
| 2018/0356645 A1 | 12/2018 | Jeong et al. | |
| 2018/0364450 A1* | 12/2018 | Lee | H04N 23/55 |
| 2019/0018169 A1 | 1/2019 | Aschwanden | |
| 2022/0086317 A1* | 3/2022 | Paik | H04N 23/687 |

FOREIGN PATENT DOCUMENTS

| | | | |
|---|---|---|---|
| CN | 101726823 A | | 6/2010 |
| CN | 203365800 U | | 12/2013 |
| CN | 106303264 A | | 1/2017 |
| CN | 106405991 A | * | 2/2017 |
| CN | 106973203 A | | 7/2017 |
| CN | 107942605 A | | 4/2018 |
| CN | 207443014 U | | 6/2018 |
| CN | 108603951 A | | 9/2018 |
| CN | 110520776 A | | 11/2019 |
| JP | 8-160212 A | | 6/1996 |
| JP | 2017-085408 A | | 5/2017 |
| KR | 10-2008-0032511 A | | 4/2008 |
| KR | 10-1488831 B1 | | 2/2015 |
| KR | 10-1866482 B1 | | 6/2018 |
| KR | 10-1892857 B1 | | 8/2018 |

OTHER PUBLICATIONS

Chinese Office Action dated Feb. 26, 2021 issued in the corresponding Chinese Patent Application No. 202010020701.7. (13 pages in English)(9 pages in Chinese).

Korean Office Action issued on Mar. 18, 2020 in corresponding Korean Patent Application No. 10-2019-0002701 (8 pages in English, 6 pages in Korean).

* cited by examiner

CAMERA MODULE

CROSS-REFERENCE TO RELATED APPLICATION(S)

This application claims the benefit under 35 USC 119(a) of Korean Patent Application No. 10-2019-0002701 filed on Jan. 9, 2019 in the Korean Intellectual Property Office, the entire disclosure of which is incorporated herein by reference for all purposes.

BACKGROUND

1. Field

The following description relates to a camera module.

2. Description of Background

Camera modules have generally been installed in portable electronic devices such as tablet personal computers (PCs), laptop computers, and the like, in addition to smartphones.

The camera module is provided with an image sensor converting light into an electrical signal. In general, an imaging plane of the image sensor is provided as a plane.

Therefore, since an imaging plane of the image sensor is provided as a plane, an amount of light, received at a peripheral portion of the image sensor, is less compared with an amount of light, received at a central portion of the image sensor, and thus, a peripheral portion of a captured image is darker than a central portion thereof.

Meanwhile, a camera module has had a function of Optical Image Stabilization (OIS) provided for compensating for shaking during capturing. Such a camera module provided with the OIS function allows a lens or an image sensor to be horizontally moved to compensate for shaking, generally.

However, in this case, shaking data measured by a gyro sensor should be converted to be suitable for horizontal movement.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module capable of improving resolution by significantly reducing a difference between an amount of light received at a central portion of an image sensor and an amount of light received at a peripheral portion of the image sensor.

In one general aspect, a camera module includes a lens module having lenses; a reflection module disposed on an object side of the lens module, and changing a path of light so that the light incident on the reflection module is directed toward the lens module; and an image sensor disposed on an image side of the lens module. The reflection is rotatable about a first axis and a second axis perpendicular to the first axis, and an imaging plane of the image sensor includes a curved surface.

The curved surface may be concave toward the lens module.

A radius of curvature of the curved surface may be equal to a distance from a center of a reflecting surface of the reflection module to a center of the image sensor.

The camera module may include a housing accommodating the reflection module and a ball member in contact with the reflection module and the housing, and the reflection module may be supported in a rotatable manner by the ball member.

The camera module may include a first magnet mounted on a first surface in which the reflection module and the housing oppose each other in an incident direction of the light, and a first coil mounted on a second surface in which the reflection module and the housing oppose each other in the incident direction of the light.

The camera module may include a first elastic member to elastically support the reflection module. The first elastic member may include a first elastic body and a second elastic body, respective first ends of the first elastic body and the second elastic body may be connected to the housing, and respective second ends of the first elastic body and the second elastic body may be connected to the reflection module. The first elastic body and the second elastic body may allow one of the first elastic body and the second elastic body to be compressed and the other of the first elastic body and the second elastic body to be tensioned, when the reflection module rotates.

The camera module may include a second magnet mounted on a first surface in which the reflection module and the housing oppose each other in a direction perpendicular to an incident direction of the light, and a second coil mounted on a second surface in which the reflection module and the housing oppose each other in the direction perpendicular to the incident direction of the light.

The camera module may include a second elastic member to elastically support the reflection module. The second elastic member may include a third elastic body and a fourth elastic body, respective first ends of the third elastic body and the fourth elastic body may be connected to the housing, and respective second ends of the third elastic body and the fourth elastic body may be connected to the reflection module. The third elastic body and the fourth elastic body may allow one of the third elastic body and the fourth elastic body to be compressed and the other of the third elastic body and the fourth elastic body to be tensioned, when the reflection module rotates.

In another general aspect, a camera module includes: a lens module having lenses; a lens holder into which at least a portion of the lens module is inserted; an elastic member elastically supporting the lens module; an actuator providing driving force to rotate the lens module relative to the lens holder; and an image sensor disposed on an image side the lens module, and an imaging plane of the image sensor includes a curved surface.

The elastic member may include a first elastic member disposed on a first side of the lens module with respect to an optical axis and a second elastic member disposed on a second side opposite the first side of the lens module with respect to optical axis.

The actuator may include a first magnet and a first coil, opposing each other in a direction of a first axis perpendicular to a direction of an optical axis, and a second magnet and a second coil, opposing each other in a direction of a second axis perpendicular to the direction of an optical axis, the first magnet and the second magnet may be mounted on the lens module, and the first coil and the second coil may be mounted on the lens holder.

The camera module may include a housing accommodating the lens holder; a third magnet mounted on a first surface in which the lens holder and the housing oppose each other in a direction perpendicular to a direction of an optical axis; and a third coil mounted on a second surface in which the lens holder and the housing oppose each other in the direction perpendicular to the direction of an optical axis.

In another general aspect, a camera module includes a lens module having lenses aligned along an optical axis; a reflective member to redirect light incident on a surface thereof toward the lens module, and to be rotated in two directions around an axis perpendicular to the optical axis; and an image sensor having a curved imaging plane to receive the light redirected toward the lens module after the light has passed through the lenses.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
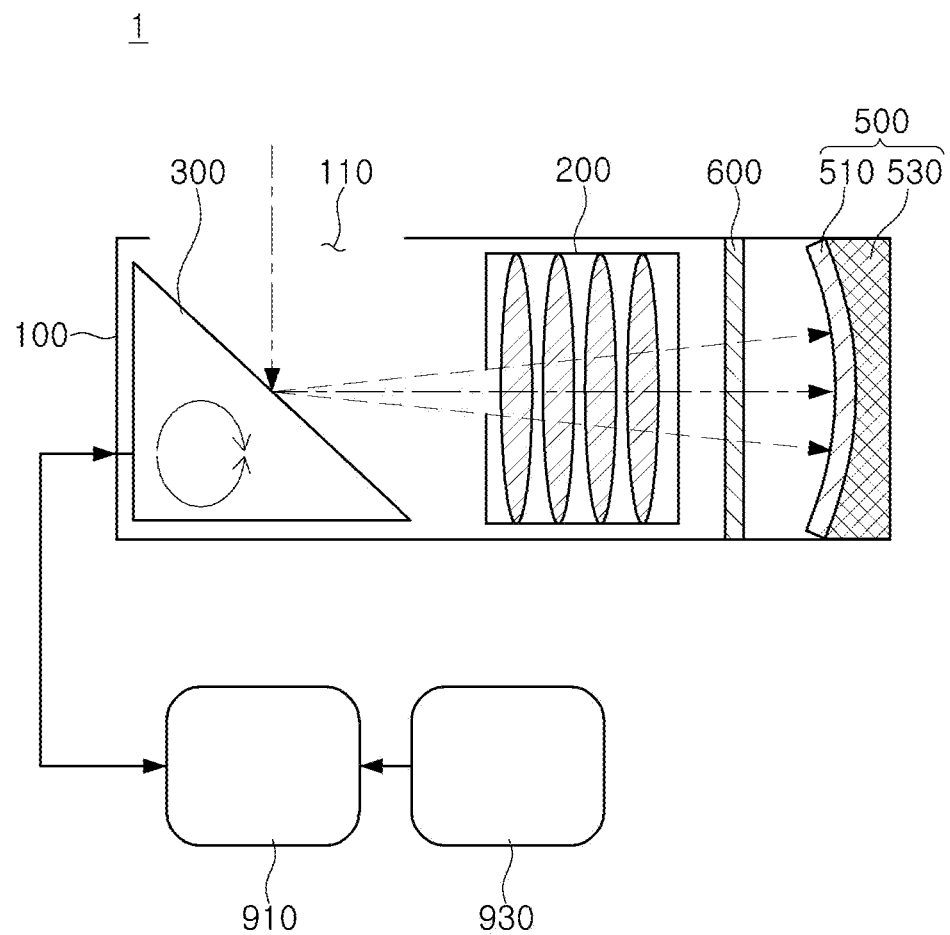
FIG. 1 is a schematic side cross-sectional view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module according to an example may be mounted on a portable electronic device.

Herein, a portable electronic device may refer to a portable electronic device such as a mobile communications terminal, a smartphone, a tablet PC, and the like.

Figure 2:
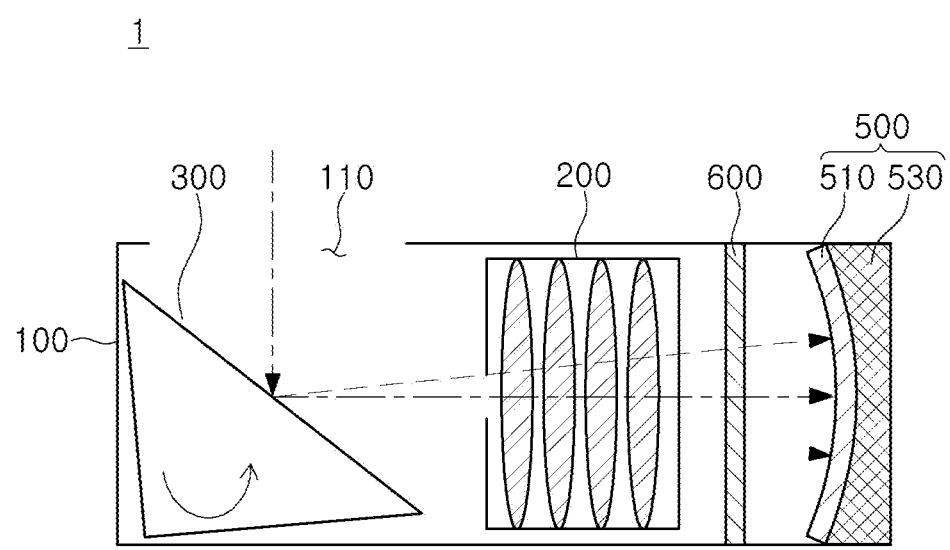
FIGS. 2 and 3 are views illustrating a reflection module rotating during shake correction.
Figure 3:
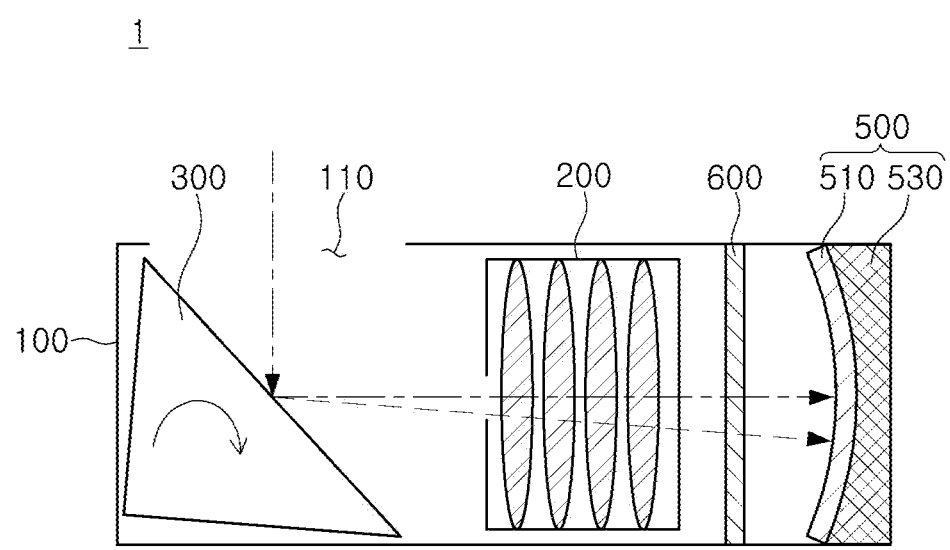

FIG. 1 is a schematic side cross-sectional view of a camera module according to an example, and FIGS. 2 and 3 are views illustrating a reflection module rotating during shake correction.

Figure 4:
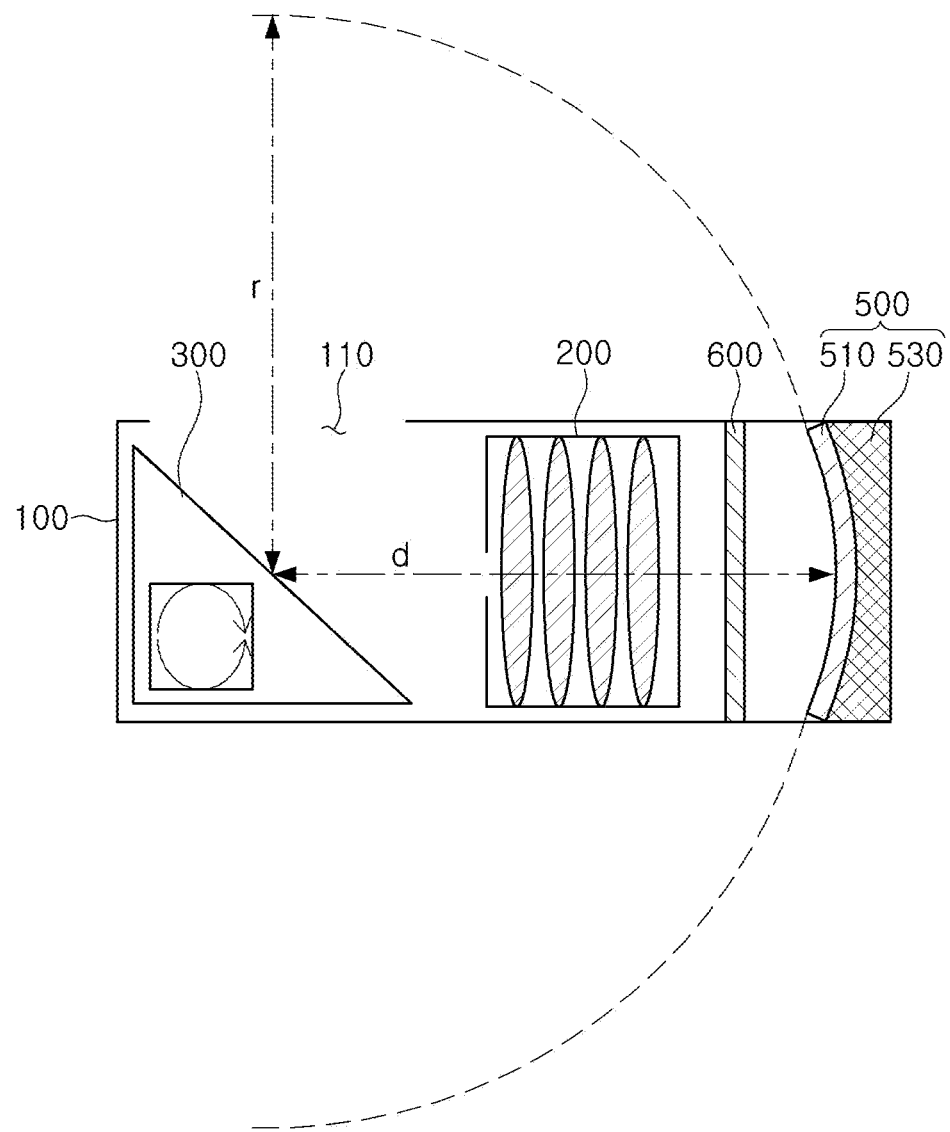
FIG. 4 is a view illustrating a radius of curvature of an imaging plane of an image sensor.
Figure 5:
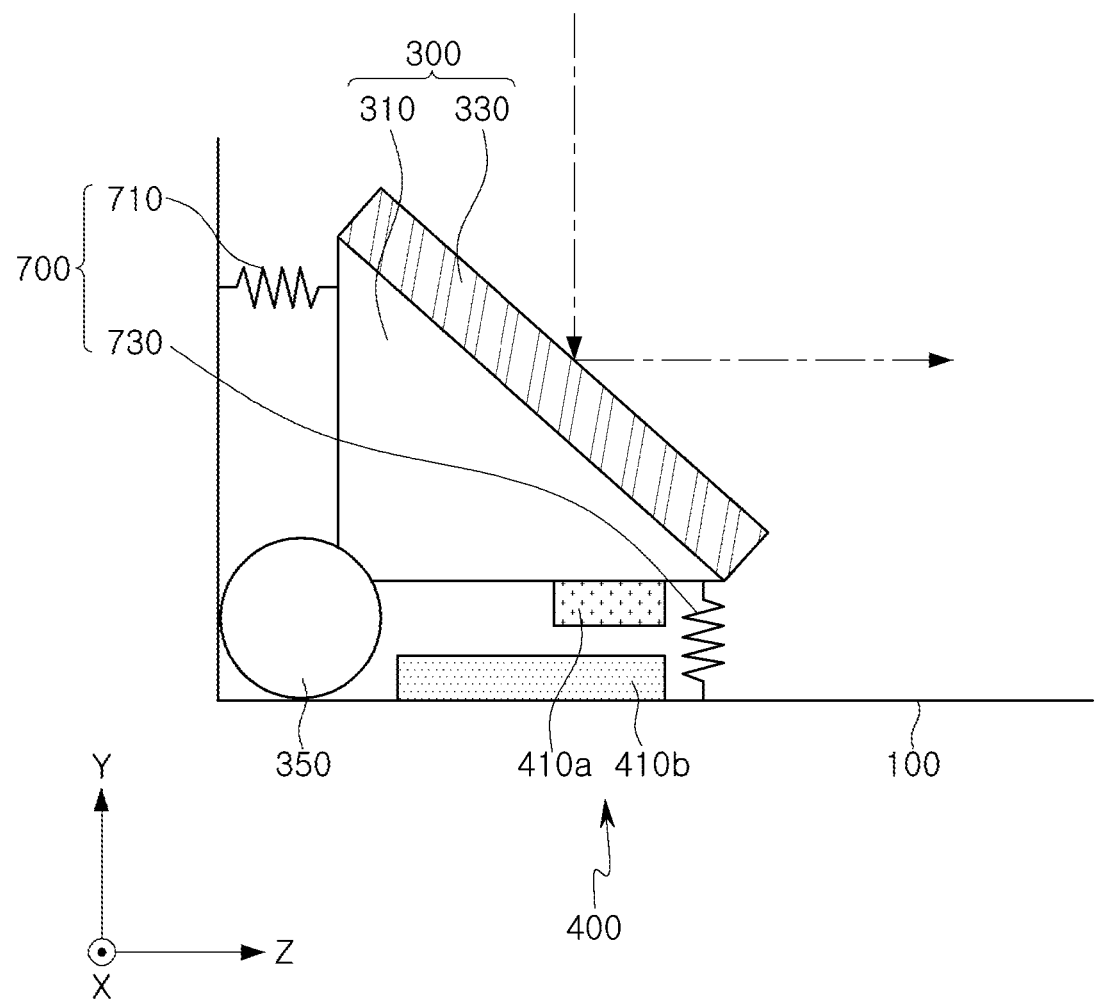
FIGS. 5, 6, 7, 8, 9, and 10 are schematic views illustrating an actuator of a camera module according to an example.
Figure 6:
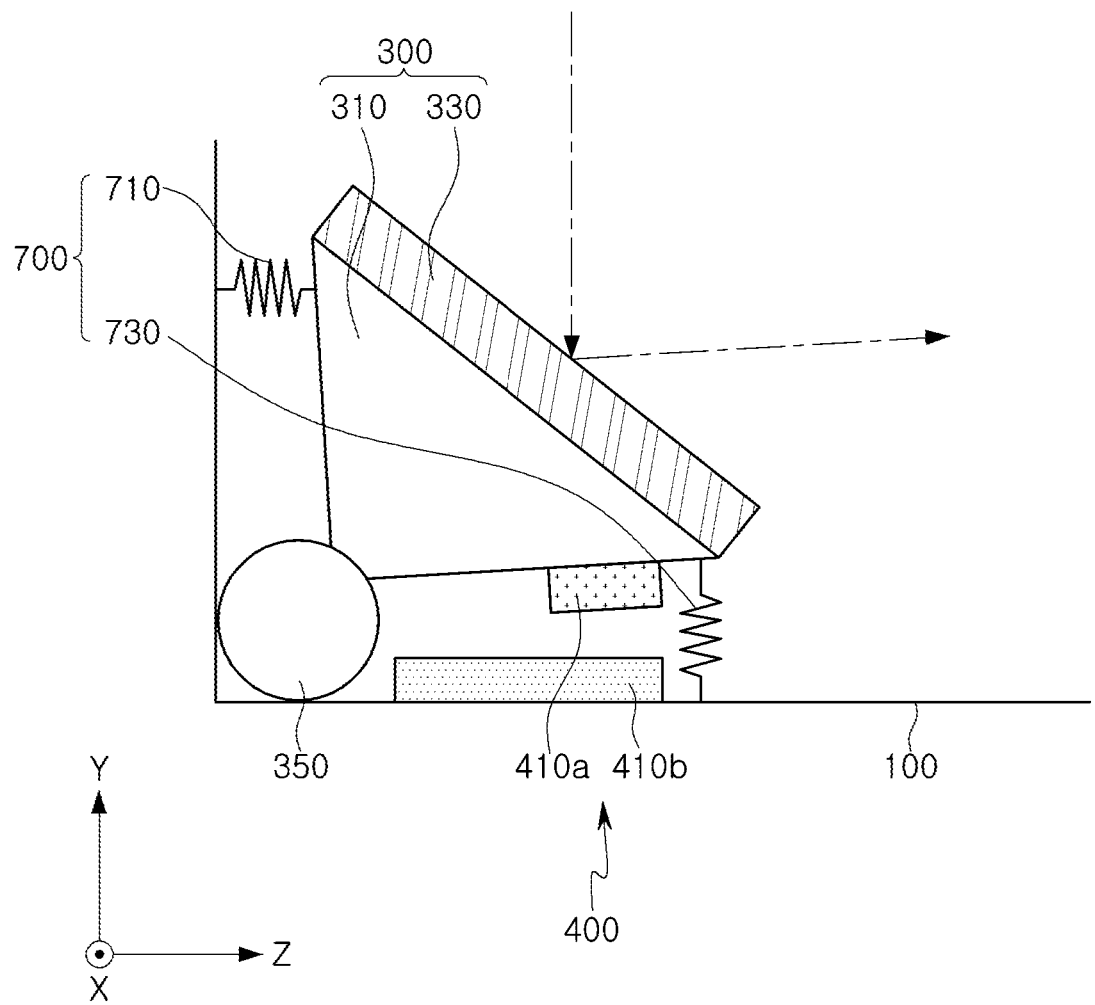
Figure 7:
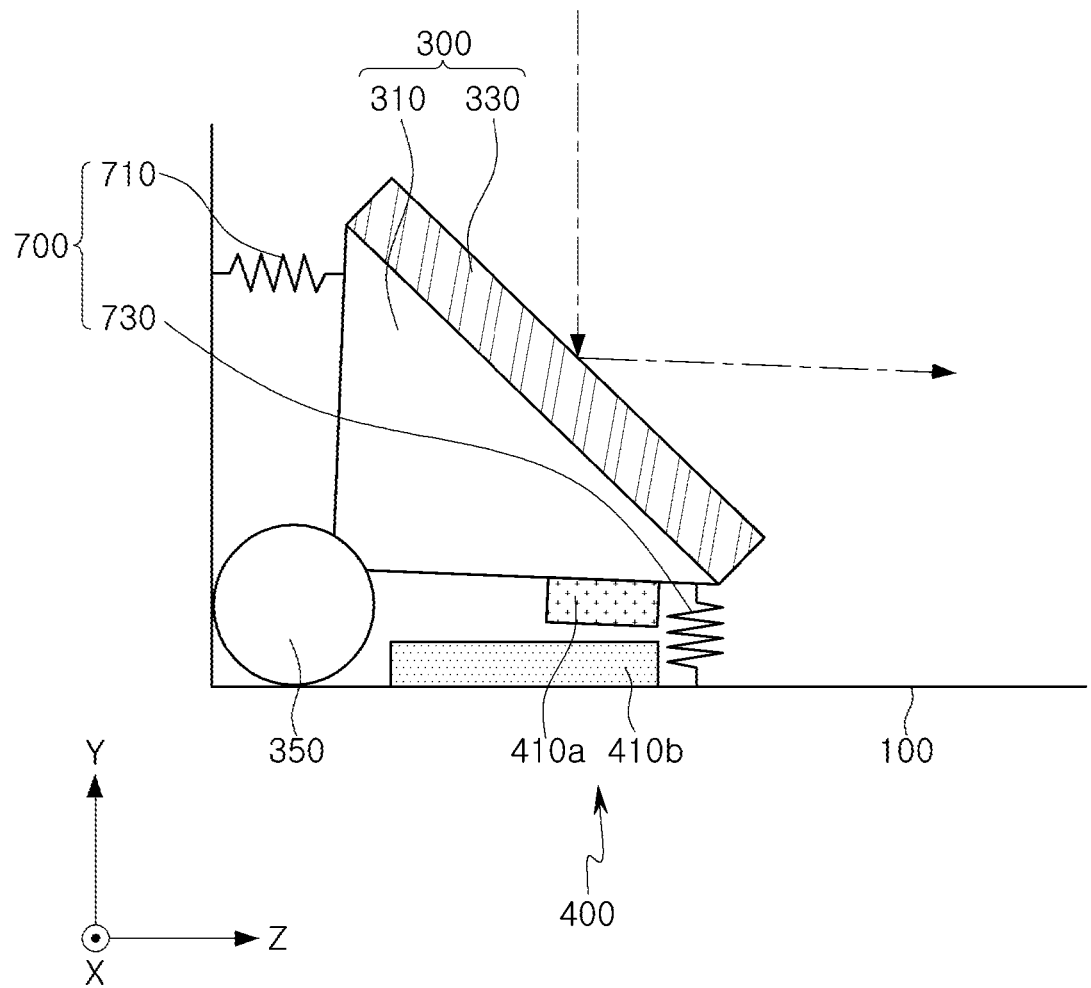

FIG. 4 is a view illustrating a radius of curvature of an imaging plane of an image sensor. FIGS. 5 through 10 are schematic views illustrating an actuator of a camera module according to various examples.

Referring to FIGS. 1 and 5-10, a camera module 1 includes a housing 100, a lens module 200, an actuator 400, a reflection module 300, and an image sensor unit 500.

The reflection module 300 is disposed in front of the lens module 200, and is configured to change a direction of light. Thus, a path of light, incident on the camera module 1, may be changed by the reflection module 300.

The front of the lens module 200 may refer to a direction (a left side based on FIG. 1) from the lens module 200 to the reflection module 300, while the rear of the lens module 200 may refer to a direction (a right side based on FIG. 1) from the lens module 200 to the image sensor unit 500.

The direction of light, incident on the camera module 1, may be changed toward the lens module 200 through the reflection module 300.

To this end, the reflection module 300 may include a reflective member 330 reflecting light. For example, the reflective member 330 may be a mirror or a prism reflecting light.

The lens module 200 includes a plurality of lenses, and light of which direction is changed by the reflection module 300 passes through the plurality of lenses.

The reflection module 300, the lens module 200, the actuator 400, and the image sensor unit 500 are accommodated inside the housing 100. However, it is possible that the reflection module 300 is disposed outside the housing 100. When the reflection module 300 is disposed inside the housing 100, the housing 100 is provided with an opening 110 on which light is incident, and a direction of light incident through the opening 110 is changed by the reflection module 300.

The camera module 1 may be configured so that the reflection module 300 rotates about two axes to compensate for blurring or shaking of an image due to factors such as shaking of the user during image capturing or video capturing.

For example, when shaking occurs during capturing due to hand shaking of the user, the shaking is compensated for by applying relative movement, corresponding to the shaking, to the reflection module 300. That is, in order to compensate for shaking, the reflection module 300 rotates, instead of the lens module 200 or the image sensor unit 500 rotating.

Since the reflection module 300, which has a relatively light weight rotates to compensate for shaking, power consumption can be significantly reduced.

The camera module 1 includes the actuator 400 for rotating the reflection module 300. The camera module 1 may further include a driver integrated circuit (IC) 910 providing an actuation signal to the actuator 400 and a gyro sensor 930 detecting shaking of the camera module 1.

The actuator 400 is configured to rotate the reflection module 300 about two axes.

FIGS. 2 and 3 illustrate the reflection module 300 rotating about one axis. That is, the reflection module 300 can rotate corresponding to shaking occurring in the camera module 1, and, even when the camera module 1 is shaken during capturing by changing a reflection angle of light due to rotation of the reflection module 300, an image is prevented from being blurred or shaken.

The image sensor unit 500 is disposed in a rear of the lens module 200. The image sensor unit 500 includes an image sensor 510 converting light passing through a plurality of lenses into an electrical signal and a printed circuit board 530 on which the image sensor 510 is mounted.

The camera module 1 may further include an infrared cut-off filter 600 blocking light in an infrared region, of light passing through a plurality of lenses. The infrared cut-off filter 600 is disposed between the lens module 200 and the image sensor unit 500, and may be coupled to the lens module 200 or the housing 100.

An imaging plane of the image sensor 510 is a curved surface.

According to the related art, since an imaging plane of the image sensor is provided as a plane, an amount of light, received at a peripheral portion of the image sensor, is less compared with an amount of light, received at a central portion of the image sensor, and thus, a peripheral portion of a captured image is captured darker than a central portion thereof.

In an example, the reflection module 300 rotates to change a reflection angle of light in order to compensate for shaking of the camera module 1. In this case, if an imaging plane of the image sensor 510 is provided as a plane, a distance at which an object is focused in a peripheral portion of the image sensor 510 is changed as compared with the case of no shaking, so the resolution of a peripheral portion of the captured image is reduced.

Thus, in the camera module 1 according to an example, an imaging plane of the image sensor 510 is a curved surface, to significantly reduce a difference between an amount of light received at a central portion of the image sensor 510 and an amount of light received at a peripheral portion of the image sensor 510, and to prevent a difference in the amount of light received at the peripheral portion of the image sensor 510 due to rotation of the reflection module 300.

The imaging plane of the image sensor 510 may be a curved surface concave toward the lens module 200.

Referring to FIG. 4, a radius of curvature r of an imaging plane of the image sensor 510 is equal to a distance d from a center of a reflecting surface of the reflection module 300 to a center of the imaging plane of the image sensor 510.

Thus, even when a reflection angle of light is changed due to rotation of the reflection module 300, the same distance at which an object is focused on an imaging plane of the image sensor 510 may be provided. Accordingly, it is possible to prevent the resolution of an image from being changed by rotation of the reflection module 300.

Here, the meaning of 'a radius of curvature r of the imaging plane of the image sensor 510 is equal to a distance d from the center of the reflecting surface of the reflection module 300 to the center of the imaging plane of the image sensor 510' does not mean only the case in which the radius of curvature r is physically equal to the distance d, but may include the case in which a tolerance during manufacturing and an error in a design process are considered.

FIGS. 5 through 10 are schematic views illustrating an actuator of a camera module according to various examples.

Referring to FIGS. 5 through 10, the reflection module 300 includes the reflective member 330 and a holder 310 supporting the reflective member 330. The holder 310 is provided with a mounting surface on which the reflective member 330 is mounted, and the mounting surface may be provided as an inclined surface.

For example, the mounting surface may be an inclined surface inclined at 45° to an optical axis of the lens module 200.

A ball member 350 is provided between the holder 310 and the housing 100, and the ball member 350 is disposed to be in contact with and support the holder 310 and the housing 100.

The holder 310 may rotate about a first axis (X-axis) and a second axis (Y-axis), perpendicular to the optical axis (Z-axis), while being supported by the ball member 350. The second axis (Y-axis) is an axis perpendicular to all the optical axis (Z-axis) and the first axis (X-axis).

The actuator 400 generates driving force for rotation of the holder 310. For example, referring to FIGS. 5, 6, and 7, the actuator 400 includes a first magnet 410a and a first coil 410b.

The first magnet 410a and the first coil 410b are disposed to oppose each other, and when power is applied to the first coil 410b, driving force is generated by the electromagnetic influence between the first magnet 410a and the first coil 410b.

The holder 310 may rotate about the first axis (X-axis) by driving force by the first magnet 410a and the first coil 410b.

The reflection module 300 and the housing 100 have surfaces opposing each other in an incident direction of light (for example, a direction of the second axis (Y-axis)).

The first magnet 410a is mounted on one surface of surfaces in which the reflection module 300 and the housing 100 oppose each other in an incident direction of light (for example, a direction of the second axis (Y-axis)), and the first coil 410b is mounted on the other surface.

For example, the first magnet 410a is mounted on the reflection module 300, while the first coil 410b is mounted on the housing 100.

The reflection module 300 is elastically supported by a first elastic member 700. For example, the first elastic member 700 is configured such that one end is connected to the housing 100, and the other end is connected to the reflection module 300 to elastically support the reflection module 300.

The first elastic member 700 includes a first elastic body 710 and a second elastic body 730. Respective first ends of the first elastic body 710 and the second elastic body 730 are connected to the housing 100, while respective second ends thereof are connected to the reflection module 300.

When the reflection module 300 rotates, one of the first elastic body 710 and the second elastic body 730 is compressed, while the other is tensioned.

Figure 8:
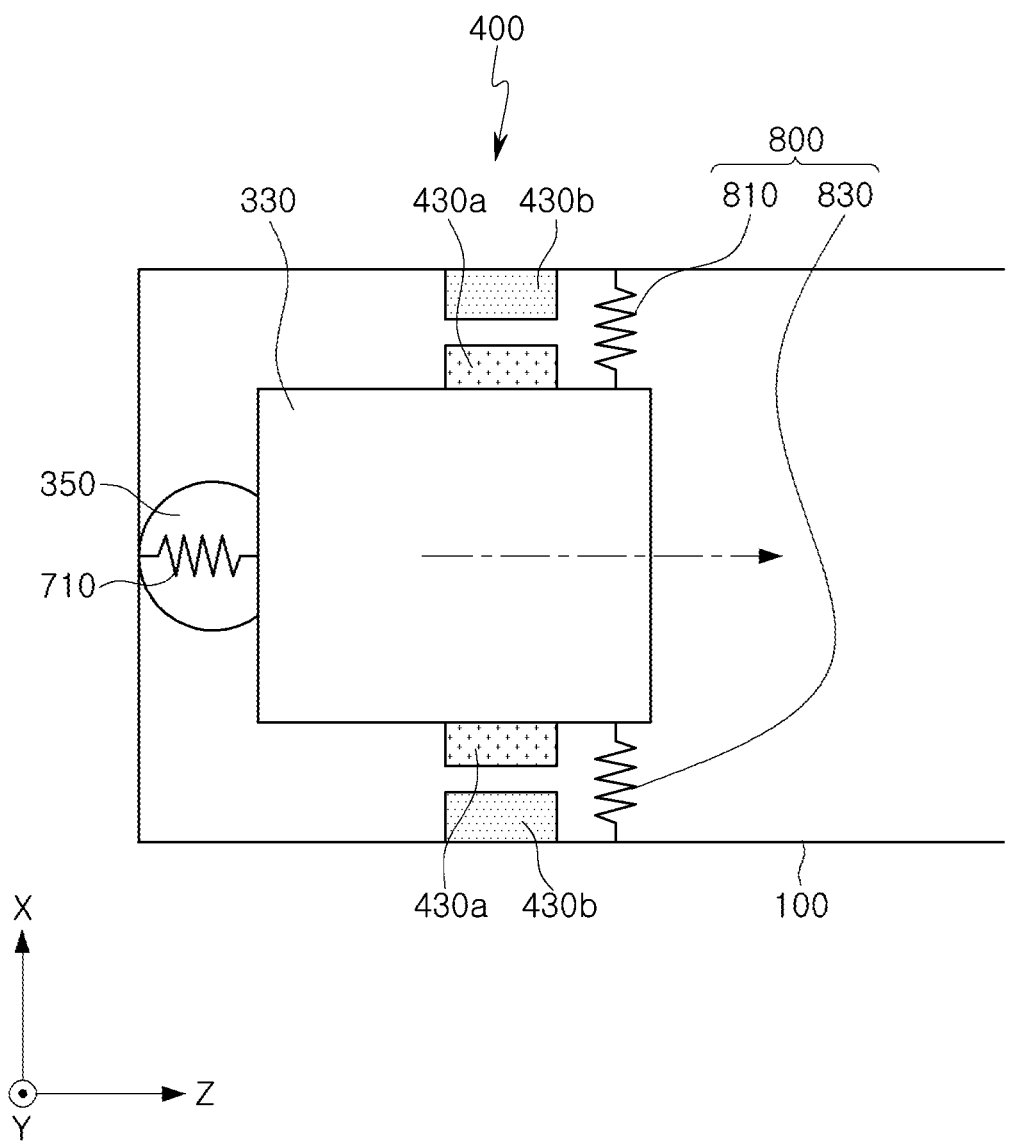
Figure 9:
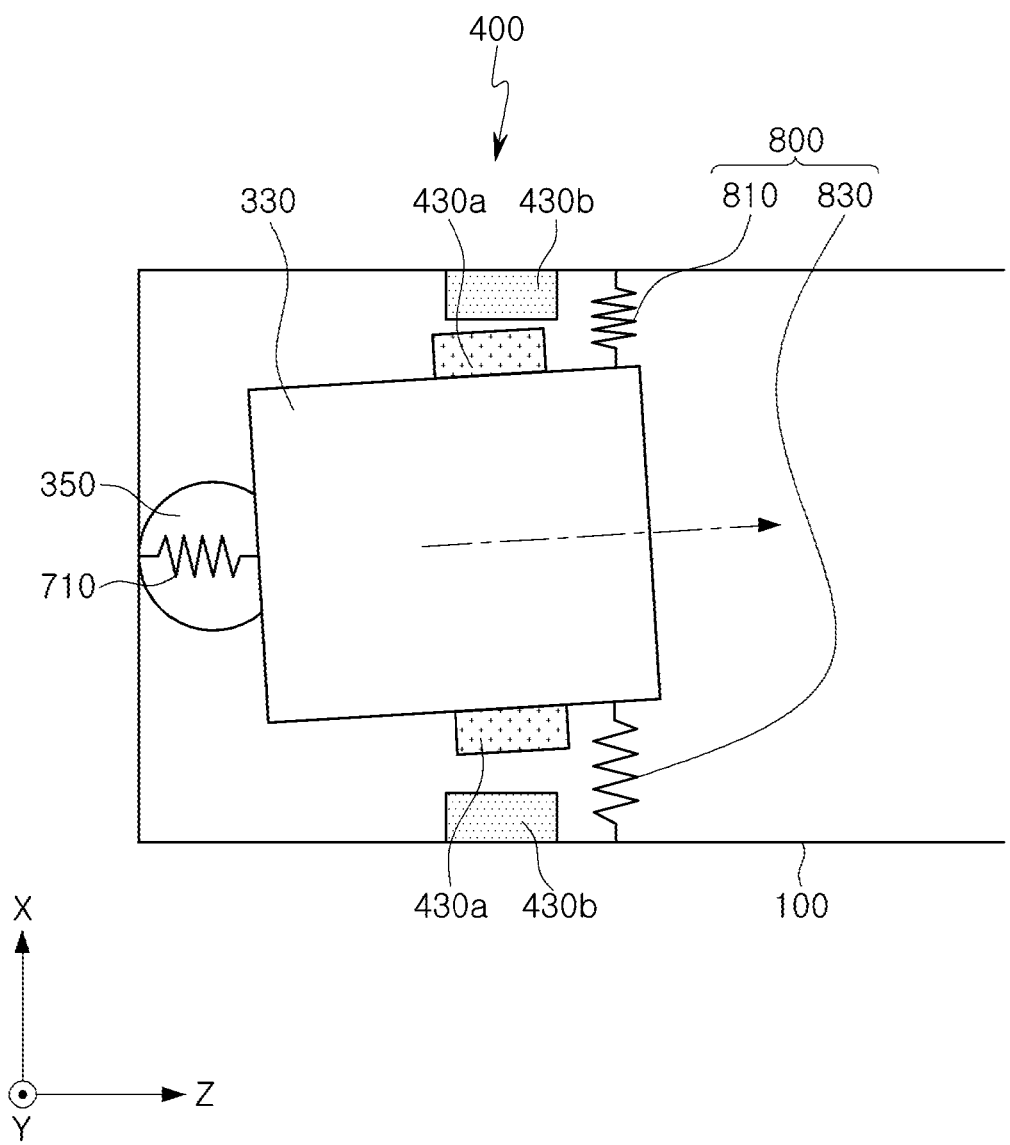
Figure 10:
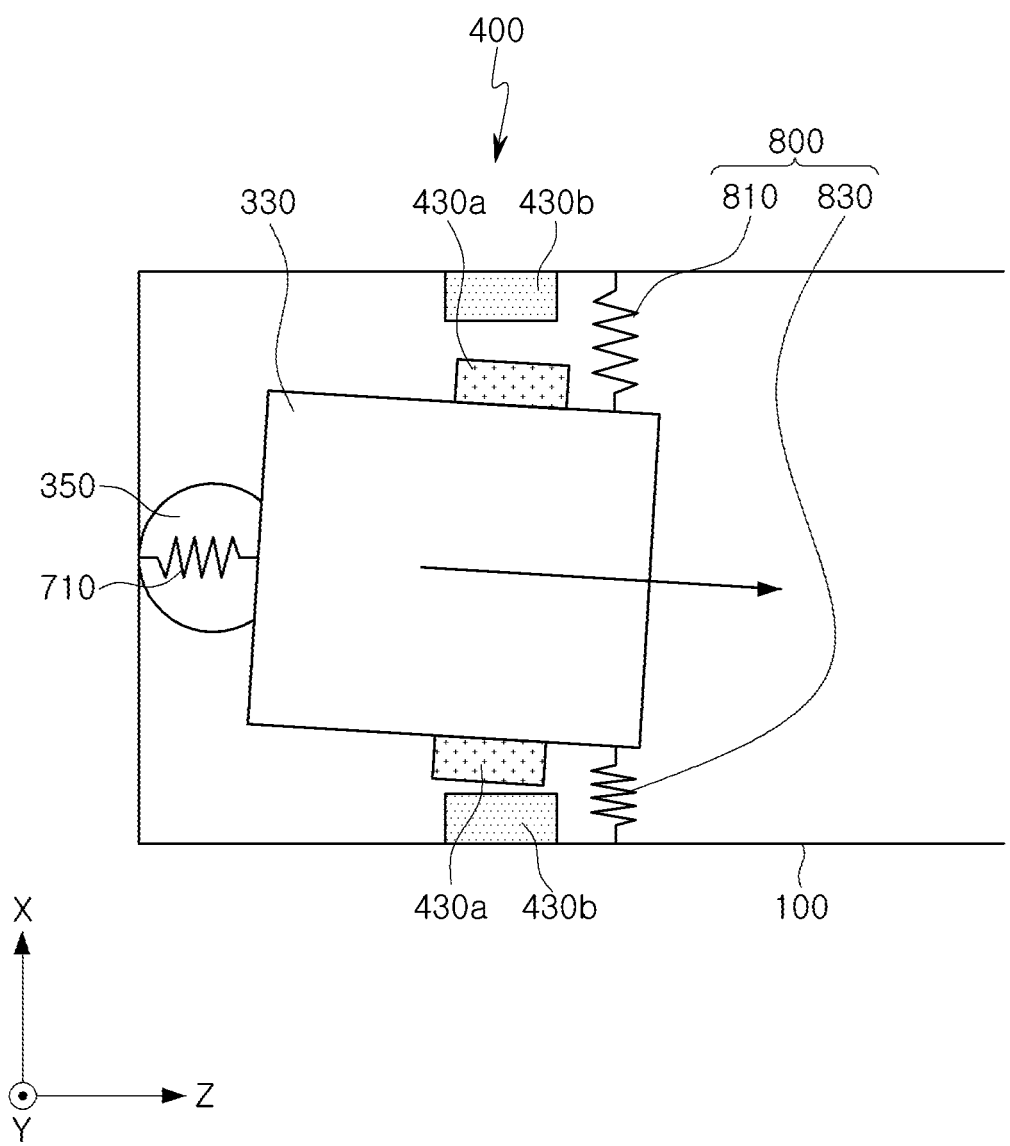

Referring to FIGS. 8 through 10, the actuator 400 may further include a second magnet 430a and a second coil 430b.

The second magnet 430a and the second coil 430b are disposed to oppose each other, and, when power is applied to the second coil 430b, driving force is generated by the electromagnetic influence between the second magnet 430a and the second coil 430b. The second magnet 430a may include two magnets, while the second coil 430b may include two coils.

The holder 310 may rotate about the second axis (Y-axis) by driving force by the second magnet 430a and the second coil 430b.

The reflection module 300 and the housing 100 have surfaces opposing each other in a direction (for example, a direction of the first axis (X-axis)) perpendicular to the incident direction of light (for example, a direction of the second axis (Y-axis)).

The second magnet 430a is mounted on one surface of surfaces in which the reflection module 300 and the housing 100 oppose each other in a direction (for example, a direction of the first axis (X-axis)) perpendicular to the incident direction of light (for example, a direction of the second axis (Y-axis)), and the second coil 430b is mounted on the other surface.

For example, the second magnet 430a is mounted on the reflection module 300, while the second coil 430b is mounted on the housing 100.

The reflection module 300 is elastically supported by a second elastic member 800. For example, the second elastic member 800 is configured such that one end is connected to the housing 100, and the other end is connected to the reflection module 300 to elastically support the reflection module 300.

The second elastic member 800 includes a third elastic body 810 and a fourth elastic body 830. Respective first ends of the third elastic body 810 and the fourth elastic body 830 are connected to the housing 100, while the respective second ends thereof are connected to the reflection module 300.

When the reflection module 300 rotates, one of the third elastic body 810 and the fourth elastic body 830 is compressed, while the other is tensioned.

Figure 11:
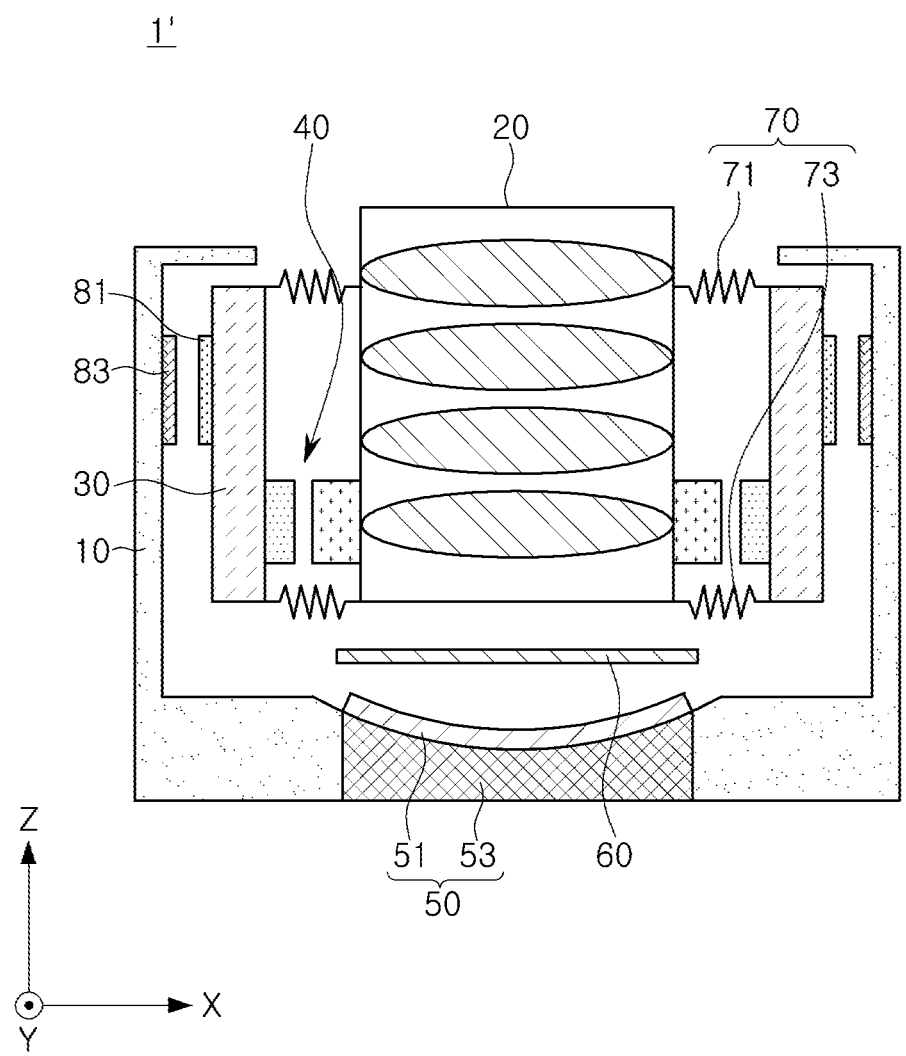
FIG. 11 is a schematic side cross-sectional view of a camera module according to an example.
Figure 12:
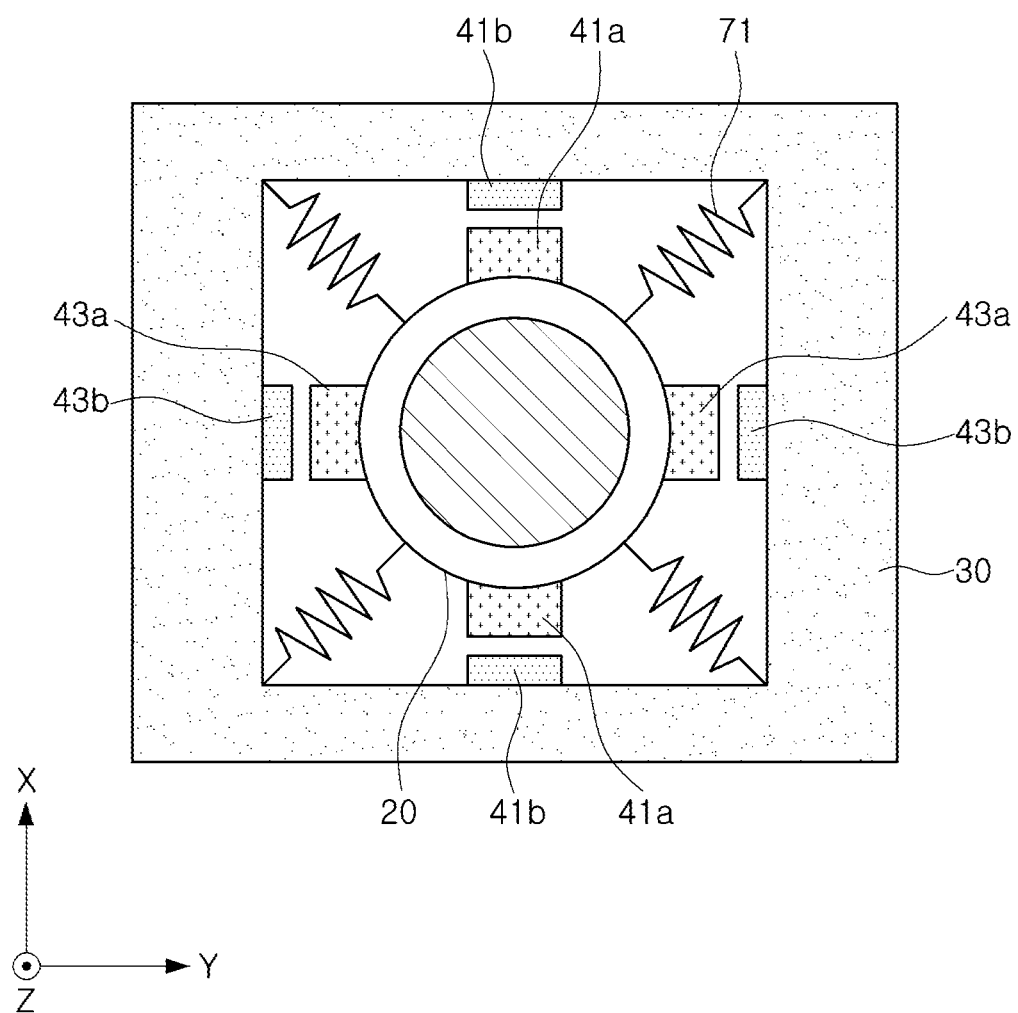
FIG. 12 is a schematic plan cross-sectional view of a camera module according to an example.

FIG. 11 is a schematic side cross-sectional view of a camera module according to an example, and FIG. 12 is a schematic plan cross-sectional view of a camera module according to an example.

Figure 13:
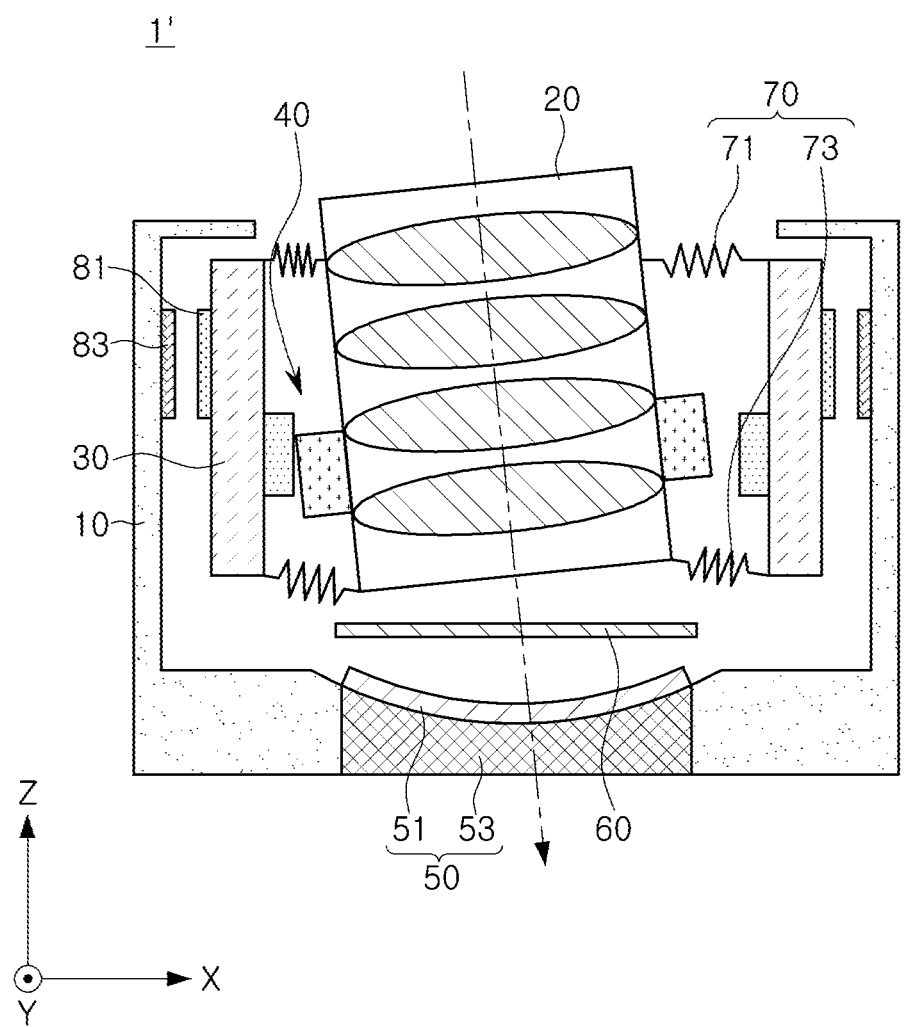
FIGS. 13 and 14 are schematic views illustrating an actuator of a camera module according to an example.
Figure 14:
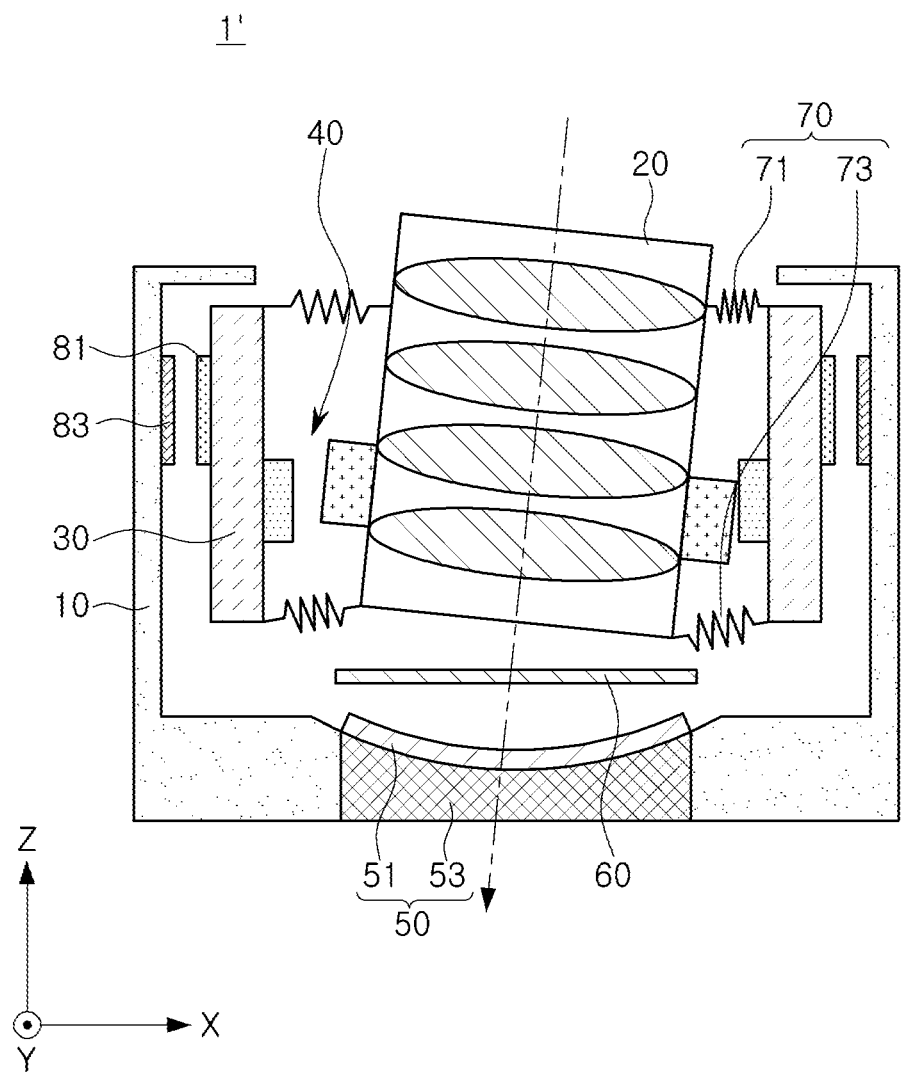

FIGS. 13 to 14 are schematic views illustrating an actuator of a camera module according to an example.

Referring to FIG. 11, a camera module 1' includes a housing 10, a lens module 20, a lens holder 30, an actuator 40, an elastic member 70, and an image sensor unit 50.

The lens module 20 is provided with a plurality of lenses, and at least a portion of the lens module 20 is disposed to be inserted into the lens holder 30.

The lens module 20, the lens holder 30, the actuator 40, the elastic member 70, and the image sensor unit 50 are accommodated inside the housing 10.

The camera module 1' may be configured so that the lens module 20 rotates about at least two axes to compensate for blurring or shaking of an image due to factors such as shaking of the user during image capturing or video capturing.

For example, when shaking occurs during capturing due to hand shaking of the user, the shaking is compensated for by applying relative movement, corresponding to the shaking, to the lens module 20.

That is, the lens module 20 rotates to compensate for shaking.

The camera module 1' includes the actuator 40 rotating the lens module 20. The camera module 1' may further include a driver IC (not shown) providing an actuation signal to the actuator 40 and a gyro sensor (not shown) detecting shaking of the camera module 1'.

The actuator 40 is configured to rotate the lens module 20 about at least two axes.

Referring to FIGS. 13 and 14, the lens module 20 rotates about one axis. That is, the lens module 20 can rotate corresponding to shaking occurring in the camera module 1', and, even when the camera module 1' is shaken during capturing due to rotation of the lens module 20, an image is prevented from being blurred or shaken.

The image sensor unit 50 is disposed in a rear of the lens module 20. The image sensor unit 50 includes an image sensor 51 converting light passing through a plurality of lenses into an electrical signal and a printed circuit board 53 on which the image sensor 51 is mounted.

The image sensor unit 50 may further include an infrared cut-off filter 60 blocking light in an infrared region, of light passing through the plurality of lenses. The infrared cut-off filter 60 is disposed between the lens module 20 and the image sensor unit 50, and may be coupled to the lens module 20 or the housing 10.

An imaging plane of the image sensor 51 is a curved surface.

According to the related art, since an imaging plane of the image sensor is provided as a plane, an amount of light, received at a peripheral portion of the image sensor, is less compared with an amount of light, received at a central portion of the image sensor, and thus, a peripheral portion of an image is captured darker than a central portion thereof.

The reflection module 20 rotates in order to compensate for shaking of the camera module 1'. In this case, if an imaging plane of the image sensor 51 is provided as a plane, a distance at which an object is focused in a peripheral portion of the image sensor 51 is changed as compared with the case of no shaking, so the resolution of a peripheral portion of the captured image is reduced.

Thus, in the camera module 1', an imaging plane of the image sensor 51 is a curved surface, to significantly reduce a difference between an amount of light received at a central portion of the image sensor 51 and an amount of light received at a peripheral portion of the image sensor 51, and to prevent a difference in the amount of light received at the peripheral portion of the image sensor 51 due to rotation of the lens module 20.

The imaging plane of the image sensor 51 may be a curved surface, which is concave toward the lens module 20.

A radius of curvature of an imaging plane of the image sensor 51 is equal to a distance from the center of rotation of the lens module 20 to the center of the imaging plane of the image sensor 51.

Thus, even when the lens module 20 rotates, the same distance at which an object is focused on an imaging plane of the image sensor 51 may be provided. Accordingly, it is possible to prevent the resolution of an image from being changed by rotation of the lens module 20.

The meaning of 'a radius of curvature of an imaging plane of the image sensor 51 is equal to a distance from the center of rotation of the lens module 20 to the center of the imaging plane of the image sensor 51' does not mean only the case in which the radius of curvature is physically equal to the distance, but may include the case in which a tolerance during manufacturing and an error in a design process are considered.

The lens module 20 may be disposed to rotate relative to the lens holder 30. The lens module 20 may rotate about at least two axes.

For example, the lens module 20 may rotate about a first axis (X-axis) and a second axis (Y-axis), perpendicular to the optical axis (Z-axis). The second axis (Y-axis) is an axis perpendicular to all the optical axis (Z-axis) and the first axis (X-axis).

The lens module 20 may rotate not only about the first axis (X-axis) and the second axis (Y-axis), but about another axis perpendicular to the optical axis (Z-axis).

The actuator 40 generates driving force for rotation of the lens module 20. For example, the actuator 40 includes a first magnet 41a, a second magnet 43a, a first coil 41b, and a second coil 43b.

The first magnet 41a and the first coil 41b are disposed to oppose each other, while the second magnet 43a and the second coil 43b are disposed to oppose each other. For example, the first magnet 41a and the first coil 41b are disposed to oppose each other in the first direction (X-direction), while the second magnet 43a and the second coil 43b are disposed to oppose each other in the second direction (Y-direction).

Each of the first magnet 41a and the second magnet 43a includes two magnets, while each of the first coil 41b and the second coil 43b includes two coils.

A direction, in which the first magnet 41a and the first coil 41b oppose each other, may be perpendicular to a direction, in which the second magnet 43a and the second coil 43b oppose each other.

When power is applied to the first coil 41b and/or the second coil 43b, driving force is generated by the electromagnetic influence between the first magnet 41a and the first coil 41b, and the electromagnetic influence between the second magnet 43a and the second coil 43b.

The lens module 20 may rotate about the second axis (Y-axis) by driving force by the first magnet 41a and the first coil 41b, and may rotate about the first axis (X-axis) by driving force by the second magnet 43a and the second coil 43b.

It is also possible to rotate the lens module 20 about another axis (an axis perpendicular to the optical axis (Z-axis)) in addition to the first axis (X-axis) and the second axis (Y-axis), by interaction of driving force by the first magnet 41a and the first coil 41b and driving force by the second magnet 43a and the second coil 43b.

The lens module 20 and the lens holder 30 are provided with surfaces opposing each other in a direction perpendicular to the optical axis (Z-axis).

Each of the first magnet 41a and the second magnet 43a is mounted on one surface of surfaces in which the lens module 20 and the lens holder 30 oppose each other in a direction perpendicular to the optical direction (Z-axis), while each of the first coil 41b and the second coil 43b is mounted on the other surface.

For example, each of the first magnet 41a and the second magnet 43a is mounted on the lens module 20, while each of the first coil 41b and the second coil 43b is mounted on the lens holder 30.

The lens module 20 is elastically supported by the elastic member 70. For example, the elastic member 70 is configured such that one end is connected to the lens holder 30 and the other end is connected to the lens module 20 to elastically support the lens module 20.

The elastic member 70 includes a first elastic member 71 and a second elastic member 73. The first elastic member 71 is disposed in an upper portion of the lens module 20 (upward in a direction of the optical axis (Z-axis)), while the second elastic member 73 is disposed in a lower portion of the lens module 20 (downwardly in a direction of the optical axis (Z-axis)).

A first end of each of the first elastic member 71 and the second elastic member 73 is connected to the lens holder 30, while the other end of each of the first elastic member 71 and the second elastic member 73 is connected to the lens module 20.

The lens module 20, the lens holder 30, the actuator 40, the elastic member 70, and the image sensor unit 50 are accommodated inside the housing 10. The lens holder 30 may move in the direction of an optical axis (Z-axis) to adjust the focus.

For example, a third magnet 81 is mounted on one surface of surfaces in which the lens holder 30 and the housing 10 oppose each other in a direction perpendicular to the optical axis (Z-axis), and a third coil 83 is mounted on the other surface.

When power is applied to the third coil 83, driving force is generated by the electromagnetic influence between the third magnet 81 and the third coil 83, and thus, the lens holder 30 could move in the direction of the optical axis (Z-axis).

The lens module 20 is elastically supported with respect to the lens holder 30 by the elastic member 70, and thus, the lens module 20 may also move in the direction of an optical axis (Z-axis) by movement of the lens holder 30.

The lens holder 30 may be supported to be moved relative to the housing 10 by an additional elastic member (not shown), a ball member (not shown), or the like.

Figure 15:
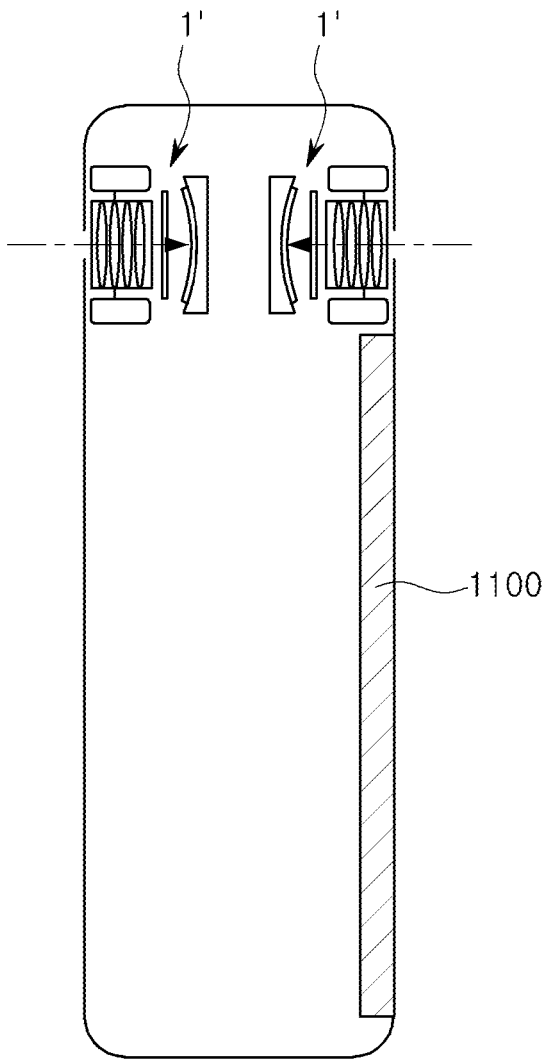
FIGS. 15, 16, and 17 are schematic cross-sectional views of a portable electronic device according to an example.
Figure 16:
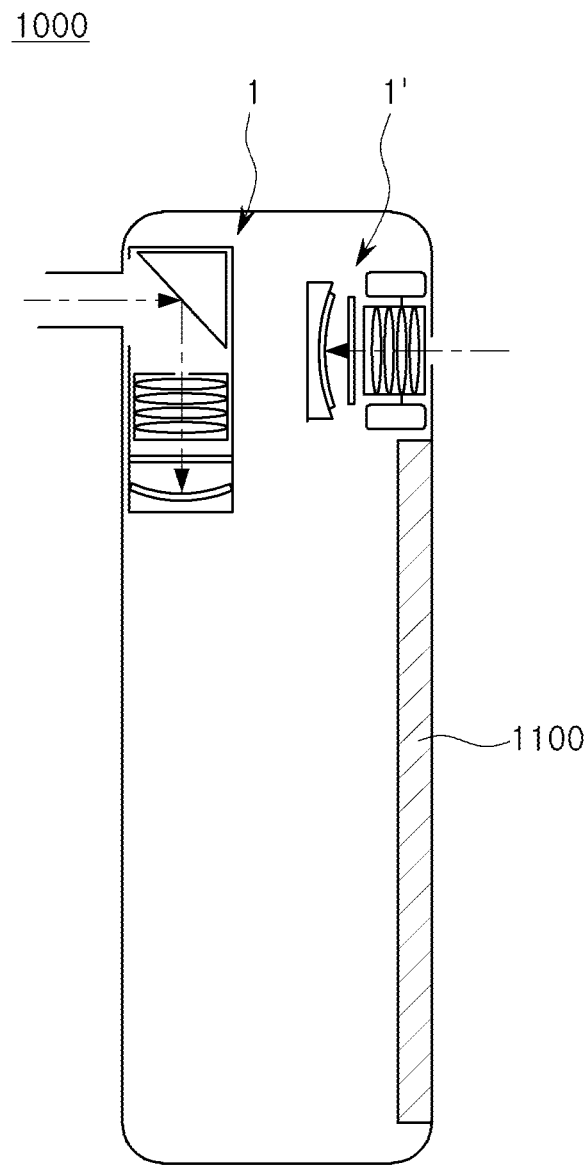
Figure 17:
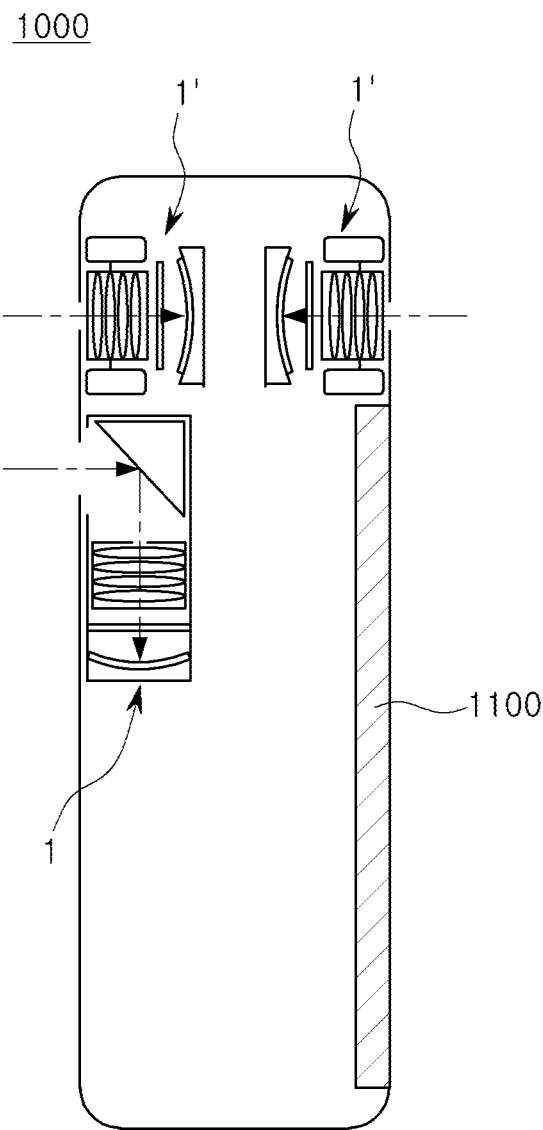

FIGS. 15, 16, and 17 are schematic cross-sectional views of a portable electronic device according to an example.

A portable electronic device 1000 may be a portable electronic device, such as a mobile communications terminal, a smartphone, or a tablet PC, on which a camera module is mounted.

The portable electronic device 1000 is provided with a plurality of camera modules. Each of the plurality of camera modules may be a camera module according to one of the various examples disclosed herein.

In FIG. 15, a camera module 1', described with reference to FIGS. 11 through 14, may be mounted on each of the front and the rear of the portable electronic device 1000.

The front of the portable electronic device 1000 may be a side in which a display unit 1100 of the portable electronic device 1000 is disposed, while the rear of the portable electronic device 1000 may be opposite the display unit 1100.

In FIG. 16, the camera module 1', described with reference to FIGS. 11 through 14, is mounted in front of the portable electronic device 1000, while the camera module 1, described with reference to FIGS. 1 through 10, is mounted in the rear of the portable electronic device 1000.

In the case of the camera module 1 of the portable electronic device 1000, the camera module 1 is disposed to allow the optical axis (Z-axis) of the lens module 200 to be perpendicular to a thickness direction of the portable electronic device 1000 (a direction from the front to the rear of the portable electronic device 1000 or an opposite direction).

For example, in the case of the camera module 1 mounted on the rear of the portable electronic device 1000, the optical axis (Z-axis) of the lens module 200 may be formed in a longitudinal direction or a width direction of the portable electronic device 1000.

In FIG. 17, a camera module 1', described with reference to FIGS. 11 through 14, may be mounted on each of the front and the rear of the portable electronic device 1000. In addition, the camera module 1, described with reference to FIGS. 1 through 10, may be additionally mounted.

A camera module according to various examples may improve the resolution by significantly reducing a difference between an amount of light received at a central portion of an image sensor and an amount of light received at a peripheral portion of the image sensor.

As set forth above, a camera module may improve the resolution by significantly reducing a difference between an amount of light received at a central portion of an image sensor and an amount of light received at a peripheral portion of the image sensor.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens module comprising lenses;
   a housing accommodating the lens module, the housing including an opening configured to receive incident light;
   a reflection module disposed on an object side of the lens module, and configured to change a path of light so that the light incident on the reflection module is directed toward the lens module;
   an image sensor disposed on an image side of the lens module and comprising a curved surface;
   a first elastic member configured to elastically support the reflection module and to rotate the reflection module with respect to a first axis, the first elastic member including at least one elastic body that is connected to an inner surface of the housing facing the opening;
   a second elastic member configured to elastically support the reflection module and to rotate the reflection module with respect to a second axis that is perpendicular to the first axis; and
   a ball member defining a rotational center of the reflective module to support the rotation of the reflection module,
   wherein the reflection module is configured to rotate with respect to the first axis and the second axis centered on the ball member.

2. The camera module of claim 1, wherein the curved surface is concave toward the lens module.

3. The camera module of claim 1, further comprising:
   a housing accommodating the reflection module.

4. The camera module of claim 3, further comprising a first magnet mounted on a first surface in which the reflection module and the housing oppose each other in an incident direction of the light, and a first coil mounted on a second surface in which the reflection module and the housing oppose each other in the incident direction of the light.

5. The camera module of claim 4, wherein the first elastic member comprises a first elastic body and a second elastic body, which corresponds to the at least one elastic body, respective first ends of the first elastic body and the second elastic body are connected to the housing, and respective second ends of the first elastic body and the second elastic body are connected to the reflection module, and
   the first elastic body and the second elastic body are configured to allow one of the first elastic body and the second elastic body to be compressed and the other of the first elastic body and the second elastic body to be tensioned, when the reflection module rotates.

6. The camera module of claim 3, further comprising a second magnet mounted on a first surface in which the reflection module and the housing oppose each other in a direction perpendicular to an incident direction of the light, and a second coil mounted on a second surface in which the reflection module and the housing oppose each other in the direction perpendicular to the incident direction of the light.

7. The camera module of claim 6,
wherein the second elastic member comprises a third elastic body and a fourth elastic body, respective first ends of the third elastic body and the fourth elastic body being connected to the housing, and respective second ends of the third elastic body and the fourth elastic body being connected to the reflection module, and the third elastic body and the fourth elastic body are configured to allow one of the third elastic body and the fourth elastic body to be compressed and the other of the third elastic body and the fourth elastic body to be tensioned, when the reflection module rotates.

8. A camera module, comprising:
a lens module comprising lenses aligned along an optical axis;
a housing accommodating the lens module, the housing including an opening configured to receive incident light;
a reflective member configured to redirect light incident on a surface thereof toward the lens module, and configured to be rotated in two directions around an axis perpendicular to the optical axis;
an image sensor comprising a curved imaging plane configured to receive the light redirected toward the lens module after the light has passed through the lenses;
a first elastic member configured to elastically support the reflective member, the first elastic member including at least one elastic body that is connected to an inner surface of the housing facing the opening; and
a ball member defining a rotational center of the reflective member to support the rotation of the reflection member,
wherein the reflective member is configured to rotate around the axis perpendicular to the optical axis.

* * * * *